United States Patent [19]

Ishida et al.

[11] Patent Number: 5,212,254
[45] Date of Patent: May 18, 1993

[54] PROCESS FOR PRODUCING CHLOROSULFONATED POLYOLEFIN IN PRESENCE OF OLEFIN

[75] Inventors: Yoshiaki Ishida; Katsushige Okayama, both of Yamaguchi, Japan

[73] Assignee: Tosoh Corporation, Yamaguchi, Japan

[21] Appl. No.: 686,385

[22] Filed: Apr. 17, 1991

[30] Foreign Application Priority Data

Apr. 19, 1990 [JP]  Japan ................................. 2-101802
Apr. 20, 1990 [JP]  Japan ................................. 2-102847

[51] Int. Cl.$^5$ ...................... C08F 8/38; C08C 19/20
[52] U.S. Cl. ................... 525/344; 525/281; 525/330.9
[58] Field of Search ......................... 525/344

[56] References Cited

U.S. PATENT DOCUMENTS

| | | | |
|---|---|---|---|
| 2,972,604 | 2/1961 | Reynolds | 525/344 |
| 3,299,014 | 1/1967 | Kalil | 525/344 |
| 4,663,396 | 5/1987 | Nakagawa | 525/344 |
| 4,871,815 | 10/1989 | Nakagawa | 525/344 |

*Primary Examiner*—Christopher Henderson
*Attorney, Agent, or Firm*—Sughrue, Mion, Zinn, Macpeak & Seas

[57] ABSTRACT

A process for producing a chlorinated polyolefin is disclosed, which comprises dissolving or suspending a polyolefin in a solvent and conducting chlorination reaction of the dissolved or suspended polyolefin, said solvent being a chloroform-based solvent comprising a mixture of 100 parts by weight of chloroform containing no alcohol and from 0.0005 to 15 parts by weight of a compound having from 4 to 10 carbon atoms and containing one or more double bonds per molecule. A process for producing a chlorosulfonated polyolefin is also disclosed, which comprises dissolving or suspending a polyolefin in a solvent and conducting chlorination and chlorosulfonation reaction of the dissolved or suspended polyolefin, said solvent being a chloroform-based solvent comprising a mixture of 100 parts by weight of chloroform containing no alcohol and from 0.0005 to 15 parts by weight of a compound having from 4 to 10 carbon atoms and containing one or more double bonds per molecule.

6 Claims, No Drawings

PROCESS FOR PRODUCING CHLOROSULFONATED POLYOLEFIN IN PRESENCE OF OLEFIN

FIELD OF THE INVENTION

The present invention relates to a process for producing a chlorinated polyolefin, specifically a process in which a chlorinated polyolefin is produced by chlorination reaction of a polyolefin dissolved or suspended in chloroform. The present invention further relates to a process for producing a chlorosulfonated polyolefin, specifically a process in which a chlorosulfonated polyolefin is produced by chlorination and chlorosulfonation reaction of a polyolefin dissolved or suspended in chloroform.

BACKGROUND OF THE INVENTION

It is known that a chlorinated or chlorosulfonated polyolefin is produced by reacting a polyolefin dissolved or suspended in a solvent. It is also known that as this solvent, a halogenated compound is used such as carbon tetrachloride, chloroform, methylene chloride, and fluorobenzene.

The most proper solvent of these is carbon tetrachloride, which is employed in many industrial processes. However, use of carbon tetrachloride is not preferable in that the compound has recently come to be suspected as a substance which destroys ozone present in the stratosphere.

On the other hand, chloroform can also be used as the solvent to produce a chlorinated or chlorosulfonated polyolefin. However, the product is disadvantageously colored yellow and has problems in practical use, for example, that formulations containing the product are apt to undergo scorching.

Chlorinated polyolefins have excellent properties such as nonflammability, weatherability, ozone resistance, chemical resistance, and electrical characteristics, and because of this, they are used, for example, as a resin modifier for polyvinyl chloride and other polymers and in light-colored electric wires and light-colored sponges.

Chlorosulfonated polyolefins are being used in escalator handrails, LP gas hoses, light-colored electric wires, leisure boats, and others.

Because beauty in color is one of the characteristics of these applications, the discoloration of the chlorinated or chlorosulfonated polyolefins themselves can be said to be a fatal defect. Further, a short scorching time of formulations containing chlorinated or chlorosulfonated polyolefins, i.e., tendency for the formulations to be prone to scorching, results in impaired processing safety when the formulations are processed into final articles such as hoses and electric wires, etc. Therefore, the chlorinated or chlorosulfonated polyolefins obtained through reactions in the conventional chloroform solvent have been of low commercial value.

All chloroform products on the market, whether for industrial use or reagent grade, generally contain from 0.5 to 1.0% of ethyl alcohol as a stabilizer. The reason for this is that since chloroform is an unstable substance and readily generates harmful phosgene, ethyl alcohol is added to suppress the generation of phosgene. (See, for example, *Iwanami Rikagaku Jiten* (Dictionary of Physicochemistry), 3rd Edition, published by Iwanami Shoten)

In other words, the substance generally called chloroform always contains such an alcohol compound. However, in this invention, such chloroform containing an alcohol compound should be clearly distinguished from chloroform containing no alcohol compound. The alcohol compound as referred to herein means a compound having an -OH group, such as, for example, ethyl alcohol and methyl alcohol.

The present inventors previously found that chlorinated or chlorosulfonated polyolefins synthesized by using, as a solvent, chloroform from which an alcohol compound stabilizer has been removed are pure-white, are not colored, and have excellent scorching stability. In addition, there was no difference therebetween in strength, elongation, hardness, and other properties after vulcanization. That is, it was found that the pure-white products and the conventional discolored products obtained using alcohol-containing chloroform cannot be distinguished from each other when viewed from the standpoint of physical properties after vulcanization.

However, since the chloroform containing no stabilizer was so unstable, there was a possibility that virulently poisonous phosgene generates, for example, in a tank storing the chloroform, in a reactor where chlorination reaction or chlorination and chlorosulfonation reaction was conducted, and during drying, etc.

Under these circumstances, there has been a strong desire for a stabilizer which, when used with chloroform to synthesize chlorinated or chlorosulfonated polyolefins, does not cause products which are colored as in the chlorinated or chlorosulfonated polyolefins synthesized by using alcohol compound-containing chloroform as a solvent and does not cause formulations containing the synthesized products to undergo scorching, and which effectively suppresses generation of virulently poisonous phosgene during storage of the chloroform or chlorination reaction or chlorination and chlorosulfonation reaction.

SUMMARY OF THE INVENTION

An object of the present invention is to provide a process for industrially producing a chlorinated polyolefin or a chlorosulfonated polyolefin, which process eliminates the above-described problems associated with the conventional processes by using chloroform as a solvent.

Other objects and effects of the present invention will be apparent from the following description.

In the first aspect of the present invention, a process for producing a chlorinated polyolefin is provided, which comprises dissolving or suspending a polyolefin in a solvent and conducting chlorination reaction of the dissolved or suspended polyolefin, the solvent being a chloroform-based solvent comprising a mixture of 100 parts by weight of chloroform containing no alcohol and from 0.0005 to 15 parts by weight of a compound having from 4 to 10 carbon atoms and containing one or more double bonds per molecule.

In the second aspect of the present invention, a process for producing a chlorosulfonated polyolefin is provided, which comprises dissolving or suspending a polyolefin in a solvent and conducting chlorination and chlorosulfonation reaction of the dissolved or suspended polyolefin, the solvent being a chloroform-based solvent comprising a mixture of 100 parts by weight of chloroform containing no alcohol and from 0.0005 to 15 parts by weight of a compound having from 4 to 10 carbon atoms and containing one or more double bonds per molecule.

DETAILED DESCRIPTION OF THE INVENTION

Examples of the compound which is added to chloroform to be used in the present invention and which has from 4 to 10 carbon atoms and contains one or more double bonds per molecule include 2-butene, 2-methyl-2-butene, 2-methyl-1-butene, 3-methyl-1-butene, 2-pentene, 2-methyl-2-pentene, 4-methyl-1-pentene, 2-methyl-1-pentene, 3-methyl-2-pentene, 2-hexene, 2-methyl-1-hexene, 3-methyl-1-hexene, 1-heptene, 1-octene, and 2-nonene.

This stabilizer is used in an amount of from 0.0005 to 15 parts by weight, and preferably from 0.0008 to 10 parts by weight per 100 parts by weight of chloroform.

Chloroform containing this stabilizer in an amount less than 0.0005 part by weight was unstable, and generation of virulently poisonous phosgene was observed during storage and reaction. On the other hand, when chloroform containing this stabilizer in an amount exceeding 15 parts by weight was used as a solvent to synthesize a chlorinated or chlorosulfonated polyolefin, the product was colored brown and formulations containing this product tended to scorch.

In the chlorination reaction in the present invention, a polyolefin dissolved or suspended in the above-described chloroform-based solvent is reacted with chlorine gas with the aid of light or a free-radical generator as a catalyst. The reaction temperature is generally from 40° to 150° C., and preferably from 60° to 110° C. The reaction pressure is generally from 0 to 10 kg/cm$^2$, and preferably from 2 to 7 kg/cm$^2$.

The chlorination and chlorosulfonation reaction in the present invention is carried out by reacting a polyolefin dissolved or suspended in the chloroform-based solvent with a combination of chlorine and sulfur dioxide, a combination of chlorine and sulfuryl chloride, a combination of chlorine, sulfur dioxide and sulfuryl chloride, or sulfuryl chloride alone, with the aid of light or a free-radical generator as a catalyst. In the case of adding sulfuryl chloride, an amine compound such as pyridine and quinoline is incorporated as a co-catalyst according to need. The reaction temperature is generally from 40° to 150° C., and preferably from 60° to 110° C. The reaction pressure is generally from 0 to 10 kg/cm$^2$, and preferably from 2 to 7 kg/cm$^2$.

Examples of the free-radical generator include $\alpha,\alpha'$-azobisisobutyronitrile, azobiscyclohexanecarbonitrile, benzoyl peroxide, and acetyl peroxide. Of these, azo compounds are preferred.

Examples of the raw material polyolefin include homopolymers and copolymers of ethylene, such as high-density polyethylene (HDPE), low-density polyethylene (LDPE), linear low-density polyethylene (LLDPE), very-low-density polyethylene (VLDPE), ethylene-vinyl acetate copolymers (EVA), and ethylenepropylene copolymers (EPM).

After completion of the reaction, the resulting polymer is separated from the solvent. This can be attained, for example, by means of steam distillation or by using a drum dryer or a vented extruder.

Furthermore, the compound having from 4 to 10 carbon atoms and containing one or more double bonds per molecule, which is used for the purpose of suppression of the generation of virulently poisonous phosgene, is contained in the chloroform solution in any production step of reaction, separation and drying, transportation, or storage. For achieving this, it is possible to suppress the generation of phosgene caused by heating in a drum dryer or an extruder by not only adding the above-described compound having from 4 to 10 carbon atoms and containing one or more double bonds per molecule to the chloroform solution before start of the reaction but also again adding it to the chloroform solution after completion of the reaction. In the alternative, the compound having from 4 to 10 carbon atoms and containing one or more double bonds per molecule may be added in a storage tank or during distillation or other steps.

Examples of the chlorinated polyolefin as referred to in the present invention include, according to the raw material polyolefins enumerated above, chlorinated polyethylenes, chlorinated ethylene-propylene copolymers, chlorinated ethylene-butene copolymers, chlorinated ethylene-hexene copolymers, and chlorinated ethylene-vinyl acetate copolymers.

Examples of the chlorosulfonated polyolefin include, according to the raw material polyolefins enumerated above, chlorosulfonated polyethylenes, chlorosulfonated ethylene-propylenecopolymers, chlorosulfonatedethylene-butene copolymers, chlorosulfonated ethylene-hexene copolymers, and chlorosulfonated ethylene-vinyl acetate copolymers.

The products obtained by the present invention may be compounded and kneaded in the same manner as in conventional rubbers or resins, and the resulting compositions may be vulcanized before use or used in an unvulcanized state. Into the products, additives and fillers for use with rubbers and resins may be incorporated. Examples include vulcanizing agents such as magnesia, calcium hydroxide, and peroxides; reinforcements such as carbon black and white carbon; fillers such as calcium carbonate and talc; plasticizers; processing aids; anti-aging agents; and vulcanization accelerators. Vulcanization can be conducted by means of steam vulcanization, UHF vulcanization, hot-air vulcanization, injection molding, rotocure, or the like.

End uses of the products of the present invention are as follows. Chlorinated polyolefins obtained by the present invention can be used for applications such as electric wire coverings, resin modifiers for PVC, PE, PP, PS, and ABS, rubber magnets, light electrical appliance parts, automotive parts, rubber parts, waterproof sheets, and sponges, like the existing chlorinated polyolefins. Chlorosulfonated polyolefins obtained by the present invention can be used for applications such as automobile hoses, gas hoses, industrial hoses, escalator handrails, electric wires, leisure boats, roofing materials, pond liners, rolls, belts, boots, packings, sheets, coated cloths, adhesives, coatings, and sealants, like the existing chlorosulfonated polyolefins.

The chlorinated polyolefin and chlorosulfonated polyolefin obtained by the present invention have high commercial values because they have improved in discoloration and scorching stability, these problems being caused by use of a conventional chloroform solvent. Furthermore, the process of the present invention is of considerable industrial importance because generation of phosgene can be prevented.

The present invention is explained below in more detail with reference to the following examples, which are intended to illustrate the invention and should not be construed to be limiting the scope of the invention.

In these examples, values showing the results of measurements and determinations were obtained according to the following methods.

Chlorine or sulfur content: combustion method in flask

Physical properties of unvulcanized rubber: JIS K 6300

Physical properties of vulcanized rubber: JIS K 6301

Hue of the product: visual judgment

Hue fastness of the product in accelerated test: 70° C. Geer oven method, visual judgment Stabilizer content in chloroform: gas chromatography Detection of phosgene gas: GS-MS (M-80B, manufactured by Hitachi, Ltd.) and harmful-gas monitor 7100 (manufactured by Shibata Kagaku Co., Ltd.)

EXAMPLE 1

Prior to reaction, ethyl alcohol contained in chloroform to be used was removed in the following way.

Chloroform manufactured by Asahi Glass Co., Ltd. and distilled water were introduced in a ratio of 1:1 (by volume) into a large-sized separatory funnel, which was then shaken vigorously. This procedure was repeated three times to extract the stabilizer ethyl alcohol with water. Further, the resulting chloroform was distilled in a nitrogen stream thereby to remove the water that had come into the chloroform.

In a 30-liter glass-lined autoclave, 28 kg of ethanol-free chloroform obtained as described above and 0.28 g of 2-methyl-2-butene were placed, and the resulting mixture was stirred. The stabilizer content in this chloroform was determined by gas chromatography and, as a result, the amount thereof was found to be 0.0013 part by weight per 100 parts by weight of chloroform. Into the autoclave was further introduced 1.96 kg of a high-density polyethylene having a melt index of 3.8 g/10 min and a density of 0.963 g/cc.

Steam was passed through a jacket of the reactor to maintain the contents at 110° C for 60 minutes, thereby uniformly dissolving the polyethylene. Throughout this heating, nitrogen gas was introduced into the reactor at a flow rate of 15 l/min to remove the air that had come into the reactor.

As a free-radical generator, 2.67 g of $\alpha,\alpha'$-azobisisobutyronitrile was put into the reactor. Reaction was carried out by introducing chlorine gas into the reactor from a separate feed inlet at a flow rate of 6 l/min over a period of 130 minutes. During this reaction, the reaction temperature of the reaction mixture and the pressure inside the reactor were kept at 110° C. and 3.5 kg/cm$^2$, respectively.

After completion of the reaction, the pressure was returned to atmospheric pressure, and the temperature in the reactor was lowered to 65° C. While the reaction mixture was kept at that temperature, nitrogen was introduced thereinto to remove the chlorine gas and hydrogen chloride gas remaining in the reaction mixture.

To the resulting solution, 45 g of bis(4-glycidyloxyphenyl)propane was added as a stabilizer. This solution was then fed to a drum dryer heated at 140° C., thereby to separate a chlorinated polyethylene as a product from the solvent.

The product was of pure-white hue. Upon analysis, this chlorinated polyethylene was found to contain 34.9 wt % of chlorine. The crude rubber had a Mooney viscosity (ML$_{1+4}$, 100° C.) of 60.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 1. The resulting compound was evaluated for physical properties of an unvulcanized compound represented by scorching time and, further, the tensile strength and other physical properties of a vulcanizate obtained from the compound were measured.

TABLE 1

|  | (Parts by weight) |
| --- | --- |
| Chlorinated polyethylene | 100 |
| Magnesia | 10 |
| SRF*[1)] | 30 |
| DOS*[2)] | 10 |
| TAIC*[3)] | 4 |
| DCP*[4)] | 3 |

*[1)]Carbon black
*[2)]Di-(2-ethylhexyl) sebacate
*[3)]Triallyl isocyanurate
*[4)]Dicumyl peroxide The results obtained are summarized in Table 2.

EXAMPLE 2

To 28 kg of ethanol-free chloroform was added 2.8 g of 2-methyl-2-butene. The resulting mixture was stirred. The stabilizer content in this chloroform was determined by gas chromatography and, as a result, the amount thereof was found to be 0.012 part by weight per 100 parts by weight of chloroform. Reaction was then conducted in the same manner as in Example 1 except that the raw material polyolefin was replaced with a high-density polyethylene having a melt index of 5.5 g/10 min and a density of 0.963 g/cc and that the introduction of chlorine gas was conducted for 150 minutes at a flow rate of 6 l/min. The resulting product was separated in the same manner as in Example 1.

The product was of pure-white hue. Upon analysis, this chlorinated polyethylene was found to contain 37.0 wt% of chlorine. The crude rubber had a Mooney viscosity (ML$_{1+4}$, 100° C.) of 103.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 1 and evaluated for physical properties of an unvulcanized compound and those of a vulcanizate.

The results obtained are summarized in Table 2.

EXAMPLE 3

To 28 kg of ethanol-free chloroform was added 0.85 g of 3-methyl-1-butene. The resulting mixture was stirred. The stabilizer content in this chloroform was determined by gas chromatography and, as a result, the amount thereof was found to be 0.0035 part by weight per 100 parts by weight of chloroform. Reaction was then conducted in the same manner as in Example 1 except that the raw material polyolefin was replaced with a linear low-density polyethylene (ethylene-butene-1 copolymer) having a melt index of 5.0 g/10 min and a density of 0.921 g/cc and that the introduction of chlorine gas was conducted for 85 minutes at a flow rate of 6 l/min. The resulting product was separated in the same manner as in Example 1.

The product was of pure-white hue. Upon analysis, this chlorinated ethylene-butene-1 copolymer was found to contain 27.2 wt % of chlorine. The crude rubber had a Mooney viscosity ($ML_{1+4}$, 100° C.) of 40.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 1 and evaluated for physical properties of an unvulcanized compound and those of a vulcanizate.

The results obtained are summarized in Table 2.

EXAMPLE 4

To 28 kg of ethanol-free chloroform was added 1.5 g of 2-pentene. The resulting mixture was stirred. The stabilizer content in this chloroform was determined by gas chromatography and, as a result, the amount thereof was found to be 0.0055 part by weight per 100 parts by weight of chloroform.

Reaction was then conducted in the same manner as in Example 1 except that the raw material polyolefin was replaced with a very-low-density polyethylene (ethylene-butene-1 copolymer) having a melt index of 6.0 g/10 min and a density of 0.900 g/cc and that the introduction of chlorine gas was conducted for 100 minutes at a flow rate of 6 l/min. The resulting product was separated in the same manner as in Example 1.

The product was of pure-white hue. Upon analysis, this chlorinated ethylene-butene-1 copolymer was found to contain 30.0 wt % of chlorine. The crude rubber had a Mooney viscosity ($ML_{1+4}$, 100° C.) of 42.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 1 and evaluated for physical properties of an unvulcanized compound and those of avulcanizate.

The results obtained are summarized in Table 2.

COMPARATIVE EXAMPLE 1

To 28 kg of ethanol-free chloroform was added 0.030 g of 2-methyl-2-butene. The resulting mixture was stirred. The stabilizer content in this chloroform was determined by gas chromatography and, as a result, the amount thereof was found to be 0.0001 part by weight per 100 parts by weight of chloroform. Reaction was then conducted, and the resulting product was separated in the same manner as in Example 1.

The product was of pure-white hue. Upon analysis, this chlorinated polyethylene was found to contain 35.0 wt% of chlorine. The crude rubber had a Mooney viscosity ($ML_{1+4}$, 100° C.) of 60.

The hue fastness of the product was examined by an accelerated test using heat, but no color hue was observed even after 10 days at 70° C.

The exhaust gas discharged during the reaction was examined for the detection of phosgene. As a result, phosgene gas was detected.

Further, the product was compounded according to the formulation shown in Table 1 and evaluated for physical properties of an unvulcanized compound and those of a vulcanizate.

The results obtained are summarized in Table 3.

COMPARATIVE EXAMPLE 2

To 28 kg of ethanol-free chloroform was added 0.050 g of 2-methyl-1-butene. The resulting mixture was stirred. The stabilizer content in this chloroform was determined by gas chromatography and, as a result, the amount thereof was found to be 0.0002 part by weight per 100 parts by weight of chloroform. Reaction was then conducted, and the resulting product was separated in the same manner as in Example 3.

The product was of pure-white hue. Upon analysis, this chlorinated ethylene-butene-1 copolymer was found to contain 26.9 wt % of chlorine. The crude rubber had a Mooney viscosity ($ML_{1+4}$, 100° C.) of 39.

The hue fastness of the product was examined by an accelerated test using heat, but no hue change was observed even after 10 days at 70° C.

The exhaust gas discharged during the reaction was examined for the detection of phosgene. As a result, phosgene gas was detected.

Further, the product was compounded according to the formulation shown in Table 1 and evaluated for physical properties of an unvulcanized compound and those of a vulcanizate.

The results obtained are summarized in Table 3.

COMPARATIVE EXAMPLE 3

28 kg of ethanol-free chloroform was added 4.5 kg of 2-pentene. The resulting mixture was stirred. The stabilizer content in this chloroform was determined by gas chromatography and, as a result, the amount thereof was found to be 16 parts by weight per 100 parts by weight of chloroform. Reaction was then conducted, and the resulting product was separated in the same manner as in Example 4.

The product was colored yellow. Upon analysis, this chlorinated ethylene-butene-1 copolymer was found to contain 27.5 wt% of chlorine. The crude rubber had a Mooney viscosity ($ML_{1+4}$, 100° C.) of 39.

The hue fastness of the product was examined by an accelerated test using heat. As a result, discoloration further proceeded and the product turned light brown after 5 days at 70° C.

Further, the product was compounded according to the formulation shown in Table 1 and evaluated for physical propeties of an unvulcanized compound property and those of a vulcanizate.

The results obtained are summarized in Table 3.

The compound had a short scorching time, showing that it was prone to scorching.

TABLE 2

|  | Example 1 | Example 2 | Example 3 | Example 4 |
| --- | --- | --- | --- | --- |
| Chlorine content (%) | 34.9 | 37.0 | 27.2 | 30.0 |
| Stabilizer | 2-methyl- | 2-methyl- | 3-methyl- | 2-pentene |

TABLE 2-continued

|  |  | Example 1 | Example 2 | Example 3 | Example 4 |
|---|---|---|---|---|---|
|  |  | 2-butene | 2-butene | 1-butene |  |
| (parts by weight) |  | 0.0013 | 0.0120 | 0.0035 | 0.0055 |
| Mooney viscosity of raw material ($ML_{1+4}$, 100° C.) |  | 60 | 103 | 40 | 42 |
| Scorching time (125° C. ML1) | Vm | 35 | 65 | 25 | 28 |
|  | $t_5$ (min) | 25.5 | 24.7 | 24.0 | 32.4 |
|  | $t_{35}$ (min) | 68.8 | 61.7 | 56.2 | 74.0 |
| Physical properties of vulcanizate (vulcanization: 150° C. × 30 min) |  |  |  |  |  |
| Tensile strength $T_B$ (kg/cm²) |  | 198 | 229 | 210 | 212 |
| Elongation $E_B$ (%) |  | 380 | 320 | 361 | 385 |
| Hardness $H_S$ (JIS-A) |  | 66 | 67 | 71 | 67 |
| 300% Modulus $M_{300}$ (kg/cm²) |  | 150 | 186 | 170 | 160 |

TABLE 3

|  |  | Comparative Example 1 | Comparative Example 2 | Comparative Example 3 |
|---|---|---|---|---|
| Chlorine content (%) |  | 35.0 | 26.9 | 27.5 |
| Stabilizer |  | 2-methyl-2-butene | 2-methyl-1-butene | 2-pentene |
| (parts by weight) |  | 0.0001 | 0.0002 | 16 |
| Mooney viscosity of raw material ($ML_{1+4}$, 100° C.) |  | 60 | 39 | 39 |
| Scorching time (125° C. ML1) | Vm | 35 | 22 | 25 |
|  | $t_5$ (min) | 25.0 | 25.9 | 9.1 |
|  | $t_{35}$ (min) | 74.9 | 65.9 | 29.2 |
| Physical properties of vulcanizate (vulcanization: 150° C. × 30 min) |  |  |  |  |
| Tensile strength $T_B$ (kg/cm²) |  | 193 | 214 | 251 |
| Elongation $E_B$ (%) |  | 368 | 358 | 278 |
| Hardness $H_S$ (JIS-A) |  | 69 | 72 | 62 |
| 300% Modulus $M_{300}$ (kg/cm²) |  | 156 | 178 | 158 |

As is apparent from the comparison between Examples 1 to 4 and Comparative Examples 1 to 3 given above, the chlorinated polyethylenes obtained by the present invention have pure-white hue and show excellent scorching stability and, at the same time, generation of virulently poisonous phosgene is not observed.

EXAMPLE 5

Prior to reaction, ethyl alcohol contained in chloroform to be used was removed in the following way.

Chloroform manufactured by Asahi Glass Co., Ltd. and distilled water were introduced in a ratio of 1:1 (by volume) into a large-sized separatory funnel, which was then shaken vigorously. This procedure was repeated three times to extract the stabilizer ethyl alcohol with water. Further, the resulting chloroform was distilled in a nitrogen stream thereby to remove the water that had come into the chloroform.

In a 30-liter glass-lined autoclave, 28 kg of ethanol-free chloroform obtained as described above and 0.28 g of 2-methyl-2-butene were placed, and the resulting mixture was stirred. The stabilizer content in this chloroform was determined by gas chromatography and, as a result, the amount thereof was found to be 0.0012 part by weight per 100 parts by weight of chloroform. Into the autoclave was further introduced 4.2 kg of a high-density polyethylene having a melt index of 5.2 g/10 min and a density of 0.964 g/cc.

As a co-catalyst for chlorosulfonation reaction, 1.12 g of pyridine was put into the reactor. Steam was then passed through a jacket of the reactor to maintain the contents at 100° C. for 30 minutes, thereby uniformly dissolving the polyethylene. Throughout this heating, nitrogen gas was introduced into the reactor at a flow rate of 15 l/min to remove the air that had come into the reactor.

As a free-radical generator, 5.67 g of $\alpha,\alpha'$-azobisisobutyronitrile was put into the reactor. Reaction was carried out by introducing 9.01 kg of sulfuryl chloride into the reactor from a separate feed inlet. During this reaction, the temperature of the reaction mixture and the pressure inside the reactor were kept at 100° C. and 3.5 kg/cm², respectively.

After completion of the reaction, the pressure was returned to atmospheric pressure, and the temperature in the reactor was lowered to 60° C. While the reaction mixture was kept at that temperature, nitrogen was introduced thereinto to remove the sulfur dioxide and hydrogen chloride gas remaining in the reaction mixture.

To the resulting solution, 72.2 g of bis(4-glycidyloxyphenyl)propane was added as a stabilizer. This solution was then fed to a drum dryer heated at 140° C., thereby to separate a chlorosulfonated polyethylene as a product from the solvent.

The product was of pure-white hue. Upon analysis, this chlorosulfonated polyethylene was found to contain 34.6 wt % of chlorine and 1.0 wt % of sulfur. The crude rubber had a Mooney viscosity ($ML_{1+4}$, 100° C.) of 56.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 4. The resulting compound was evaluated for physical properties of an unvulcanized compound represented by scorching time and, further, the tensile strength and other physical properties of a vulcanizate obtained from the compound were measured.

TABLE 4

|  | (Parts by weight) |
|---|---|
| Chlorosulfonated polyethylene | 100 |
| Magnesia | 10 |
| Pentaerythritol | 3 |
| Accelerator, TRA* | 2 |

*dipentamethylenethiuram tetrasulfide
The results obtained are summarized in Table 5.

EXAMPLE 6

To 28 kg of ethanol-free chloroform was added 2.8 g of 2-methyl-2-butene. The resulting mixture was stirred. The stabilizer content in this chloroform was determined by gas chromatography and, as a result, the amount thereof was found to be 0.011 part by weight per 100 parts by weight of chloroform. Reaction was then conducted in the same manner as in Example 5 except that the raw material polyolefin was replaced with a high-density polyethylene having a melt index of 0.85 g/10 min and a density of 0.969 g/cc. The resulting product was separated in the same manner as in Example 5.

The product was of pure-white hue. Upon analysis, this chlorosulfonated polyethylene was found to contain 35.5 wt % of chlorine and 1.0 wt % of sulfur. The crude rubber had a Mooney viscosity ($ML_{1+4}$, 100° C.) of 98.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 4 and evaluated for physical properties of an unvulcanized compound and those of a vulcanizate.

The results obtained are summarized in Table 5.

EXAMPLE 7

To 28 kg of ethanol-free chloroform was added 1.4 g of 2-pentene. The resulting mixture was stirred. The stabilizer content in this chloroform was determined by gas chromatography and, as a result, the amount thereof was found to be 0.0049 part by weight per 100 parts by weight of chloroform. Reaction was then conducted in the same manner as in Example 5 except that the raw material polyolefin was replaced with a very-low-density polyethylene (VLDPE) having a melt index of 6.0 g/10 min and a density of 0.900 g/cc and that the amount of sulfuryl chloride added was changed to 8.4 kg. The resulting product was separated in the same manner as in Example 5.

The product was of pure-white hue. Upon analysis, this chlorosulfonated polyethylene was found to contain 29.9 wt % of chlorine and 1.0 wt % of sulfur. The crude rubber had a Mooney viscosity ($ML_{1+4}$, 100° C.) of 57.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 4 and evaluated for physical properties of an unvulcanized compound and those of a vulcanizate.

The results obtained are summarized in Table 5.

EXAMPLE 8

To 28 kg of ethanol-free chloroform was added 0.84 g of 3-methyl-1-butene. The resulting mixture was stirred. The stabilizer content in this chloroform was determined by gas chromatography and, as a result, the amount thereof was found. to be 0.0031 part by weight per 100 parts by weight of chloroform. Reaction was then conducted in the same manner as in Example 5 except that the raw material polyolefin was replaced with a linear low-density polyethylene (ethylenebutene-1 copolymer) having a melt index of 5.0 g/10 min and a density of 0.922 g/cc and that the amount of sulfuryl chloride added was changed to 5.9 kg. The resulting product was separated in the same manner as in Example 5.

The product was of pure-white hue. Upon analysis, this chlorosulfonated ethylene-butene-1 copolymer was found to contain 26 wt 5 of chlorine and 1.0 wt % of sulfur. The crude rubber had a Mooney viscosity ($ML_{1+4}$, 100° C.) of 42.

The hue fastness of the product was examined by an accelerated test using heat, but no hue change was observed even after 10 days at 70° C.

The exhaust gas discharged during the reaction was examined for the detection of phosgene. As a result, phosgene gas was not detected at all.

Further, the product was compounded according to the formulation shown in Table 4 and evaluated for physical properties of an unvulcanized compound and those of a vulcanizate.

The results obtained are summarized in Table 5.

COMPARATIVE EXAMPLE 4

To 28 kg of ethanol-free chloroform was added 0.056 g of 2-methyl-2-butene. The resulting mixture was stirred. The stabilizer content in this chloroform was determined by gas chromatography and, as a result, the amount thereof was found to be 0.0002 part by weight per 100 parts by weight of chloroform. Reaction was then conducted, and the resulting product was separated in the same manner as in Example 5.

The product was of pure-white hue. Upon analysis, this chlorosulfonated polyethylene was found to contain 34.9 wt % of chlorine and 1.0 wt % of sulfur. The crude rubber had a mooney viscosity ($ML_{1+4}$, 100° C.) of 56.

The hue fastness of the product was examined by an accelerated test using heat, but no hue change was observed even after 10 days at 70° C.

The exhaust gas discharged during the reaction was examined for the detection of phosgene. As a result, phosgene gas was detected, showing that generation of virulently poisonous phosgene had been insatisfactorily suppressed.

Further, the product was compounded according to the formulation shown in Table 4 and evaluated for physical properties of an unvulcanized compound and those of a vulcanizate.

The results obtained are summarized in Table 6.

COMPARATIVE EXAMPLE 5

To 28 kg of ethanol-free chloroform was added 0.080 g of 2-pentene. The resulting mixture was stirred. The stabilizer content in this chloroform was determined by gas chromatography and, as a result, the amount thereof was found to be 0.0003 part by weight per 100 parts by weight of chloroform. Reaction was then conducted, and the resulting product was separated in the same manner as in Example 7.

The product was of pure-white hue. Upon analysis, this chlorosulfonated polyethylene was found to contain 30.0 wt % of chlorine and 1.0 wt % of sulfur. The crude rubber had a Mooney viscosity (ML$_{1+4}$, 100° C.) of 57.

The hue fastness of the product was examined by an accelerated test using heat, but no hue change was observed even after 10 days at 70° C.

The exhaust gas discharged during the reaction was examined for the detection of phosgene. As a result, phosgene gas was detected, showing that generation of virulently poisonous phosgene had been insatisfactorily suppressed.

Further, the product was compounded according to the formulation shown in Table 4 and evaluated for physical properties of an unvulcanized compound and those of a vulcanizate.

The results obtained are summarized in Table 6.

COMPARATIVE EXAMPLE 6

To 28 kg of ethanol-free chloroform was added 4.5 kg of 2-methyl-2-butene. The resulting mixture was stirred. The stabilizer content in this chloroform was determined by gas chromatography and, as a result, the amount thereof was found to be 16 parts by weight per 100 parts by weight of chloroform. Reaction was then conducted, and the resulting product was separated in the same manner as in Example 8.

The product was colored yellow. Upon analysis, this chlorosulfonated ethylene-butene-1 copolymer was found to contain 25.0 wt % of chlorine and 0.9 wt % of sulfur. The crude rubber had a Mooney viscosity (ML$_{1+4}$, 100° C.) of 42.

The hue fastness of the product was examined by an accelerated test using heat. As a result, discoloration further proceeded, and the product turned light brown after 5 days at 70° C.

The exhaust gas discharged curing the reaction was examined for the detection of phosgene. As a result, phosgene gas was not detected at all.

Further, the product was compounded according to the formulation shown in Table 4 and evaluated for physical properties of an unvulcanized compound and those of a vulcanizate.

The results obtained are summarized in Table 6.

The compound had a short scorching time, showing that it was prone to scorching.

TABLE 5

|  |  | Example 5 | Example 6 | Example 7 | Example 8 |
|---|---|---|---|---|---|
| Chlorine content (%) |  | 34.6 | 35.5 | 29.9 | 26.0 |
| Sulfur content (%) |  | 1.0 | 1.0 | 1.0 | 1.0 |
| Stabilizer |  | 2-methyl-2-butene | 2-methyl-2-butene | 2-pentene | 3-methyl-1-butene |
| (parts by weight) |  | 0.0012 | 0.0110 | 0.0049 | 0.0031 |
| Mooney viscosity of raw material (ML$_{1+4}$, 100° C.) |  | 56 | 98 | 57 | 42 |
| Scorching time |  |  |  |  |  |
| (125° C. ML1) | Vm | 46 | 76 | 49 | 38 |
|  | t$_5$ (min) | 9.0 | 8.5 | 10.3 | 6.4 |
|  | t$_{35}$ (min) | 16.5 | 14.0 | 24.8 | 14.0 |
| Physical properties of vulcanizate (vulcanization: 150° C. × 30 min) |  |  |  |  |  |
| Tensile strength T$_B$ (kg/cm$^2$) |  | 298 | 335 | 285 | 272 |
| Elongation E$_B$ (%) |  | 550 | 490 | 500 | 500 |
| Hardness Hs (JIS-A) |  | 59 | 61 | 62 | 61 |
| 300% Modulus M$_{300}$ (kg/cm$^2$) |  | 64 | 86 | 93 | 73 |

TABLE 6

|  |  | Comparative Example 4 | Comparative Example 5 | Comparative Example 6 |
|---|---|---|---|---|
| Chlorine content (%) |  | 34.9 | 30.0 | 25.0 |
| Sulfur content (%) |  | 1.0 | 1.0 | 0.9 |
| Stabilizer |  | 2-methyl-2-butene | 2-pentene | 2-methyl-2-butene |
| (parts by weight) |  | 0.0002 | 0.0003 | 16 |
| Mooney viscosity of raw material (ML$_{1+4}$: 100° C.) |  | 56 | 57 | 42 |
| Scorching time |  |  |  |  |
| (125° C. ML1) | Vm | 46 | 49 | 39 |
|  | t$_5$ (min) | 9.1 | 10.7 | 3.3 |
|  | t$_{35}$ (min) | 16.3 | 23.9 | 11.8 |
| Physical properties of vulcanizate (vulcanization: 150° C. × 30 min) |  |  |  |  |
| Tensile strength T$_B$ (kg/cm$^2$) |  | 290 | 284 | 271 |
| Elongation E$_B$ (%) |  | 548 | 498 | 500 |
| Hardness Hs (JIS-A) |  | 59 | 62 | 62 |
| 300% Modulus M$_{300}$ (kg/cm$^2$) |  | 65 | 91 | 73 |

As is apparent from the comparison between Examples 5 to 8 and Comparative Examples 4 to 6 given above, the chlorosulfonated polyethylenes obtained by the present invention have pure-white hue and show excellent scorching stability and, at the same time, generation of virulently poisonous phosgene is suppressed.

While the invention has been described in detail and with reference to specific embodiments thereof, it will be apparent to one skilled in the art that various changes and modifications can be made therein without departing from the spirit and scope thereof.

What is claimed is:

1. A process for producing a chlorosulfonated polyolefin which comprises dissolving or suspending a polyolefin in a solvent and conducting chlorination and chlorosulfonation reaction of the dissolved or suspended polyolefin, said solvent being a chloroform-based solvent comprising a mixture of 100 parts by weight of chloroform containing no alcohol and a compound having from 4 to 10 carbon atoms and containing one or more double bonds per molecule, which compound stabilizes the chloroform to prevent the generation of phosgene, wherein said compound having from 4 to 10 carbon atoms and containing one or more double bonds per molecule is used in an amount of from 0.0008 to 10 parts by weight per 100 parts by weight of said chloroform containing no alcohol.

2. A process as in claim 1, wherein the chlorination and chlorosulfonation reaction is carried out by using a combination of chlorine and sulfur dioxide, a combination of chlorine and sulfuryl chloride, a combination of chlorine, sulfur dioxide and sulfuryl chloride, or sulfuryl chloride alone, with the aid of light or a free-radical generator as a catalyst.

3. A process as in claim 2, wherein the chlorination and chlorosulfonation reaction is carried out at a temperature of from 40° to 150° C. and a pressure of from 0 to 10 kg/cm$^2$.

4. A process as in claim 2, wherein the chlorination and chlorosulfonation reaction is carried out at a temperature of from 60° to 100° C. and a pressure of from 2 to 7 kg/cm$^2$.

5. A process as in claim 2, wherein said free-radical generator is $\alpha,\alpha'$-azobisisobutyronitrile, azobiscyclohexanecarbonitrile, benzoly peroxide, or acetyl peroxide.

6. A process as in claim 1, wherein the compound which has from 4 to 10 carbon atoms is selected from the group consisting of 2-butene, 2-methyl-2-butene, 2-methyl-1-butene, 3-methyl-1-butene, 2-pentene, 2-methyl-2-pentene, 4-methyl-1-pentene, 2-methyl-1-pentene, 3-methyl-2-pentene, 2-hexene, 2-methyl-1-hexene, 3-methyl-1-hexene, 1-heptene, 1-octene and 2-nonene, and wherein said chlorosulfonated polyolefin is selected from the group consisting of chlorosulfonated polyethylenes, chlorosulfonated ethylenepropylene copolymers, chlorosulfonated ethylene-butene copolymers, chlorosulfonated ethylene-hexene copolymers and chlorosulfonated ethylene-vinyl acetate copolymers.

* * * * *